(12) United States Patent
Kale et al.

(10) Patent No.: US 12,443,485 B2
(45) Date of Patent: Oct. 14, 2025

(54) DATA HANDLING DURING A REFLOW OPERATION

(71) Applicant: Micron Technology, Inc., Boise, ID (US)

(72) Inventors: Poorna Kale, Folsom, CA (US); Lei Pan, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/551,596

(22) PCT Filed: Aug. 26, 2022

(86) PCT No.: PCT/CN2022/115115
§ 371 (c)(1),
(2) Date: Sep. 21, 2023

(87) PCT Pub. No.: WO2024/040569
PCT Pub. Date: Feb. 29, 2024

(65) Prior Publication Data
US 2025/0036524 A1   Jan. 30, 2025

(51) Int. Cl.
*G06F 11/10* (2006.01)
(52) U.S. Cl.
CPC ...... *G06F 11/1068* (2013.01); *G06F 11/1004* (2013.01)
(58) Field of Classification Search
CPC .................. G06F 11/1068; G06F 11/1004
See application file for complete search history.

(56) References Cited

U.S. PATENT DOCUMENTS

| | | | |
|---|---|---|---|
| 2013/0308300 A1* | 11/2013 | Thyn | A45C 11/324 362/116 |
| 2013/0308390 A1 | 11/2013 | Lee | |
| 2014/0068313 A1* | 3/2014 | Shimpuku | G06F 3/0619 713/340 |
| 2014/0281170 A1* | 9/2014 | Cho | G06F 8/63 711/103 |
| 2015/0135023 A1* | 5/2015 | Mekhanik | G11C 16/0483 714/704 |
| 2016/0099078 A1* | 4/2016 | Luo | G11C 29/46 365/201 |

(Continued)

FOREIGN PATENT DOCUMENTS

CN   111164697   5/2020

OTHER PUBLICATIONS

PCT International Search Report and Written Opinion for PCT Application No. PCT/CN2022/115115, issued Apr. 27, 2023, 7 pages.

*Primary Examiner* — Robert W Beausoliel, Jr.
(74) *Attorney, Agent, or Firm* — Holland & Hart LLP

(57) ABSTRACT

Methods, systems, and devices for data handling during a reflow operation are described. The method may include a memory system receiving first signaling indicating that a reflow operation is to be performed on the memory system and determining whether an amount of data stored in a first set of memory cells within one or more memory devices of the memory system satisfy a threshold. The method may further include the memory system communicating an indication of whether the memory system is ready for the reflow operation based on the amount of data satisfying the threshold.

20 Claims, 5 Drawing Sheets

(56) References Cited

U.S. PATENT DOCUMENTS

| | | |
|---|---|---|
| 2016/0350183 A1 | 12/2016 | Lien et al. |
| 2019/0066775 A1* | 2/2019 | Jean ................... G11C 16/3459 |
| 2021/0240381 A1 | 8/2021 | Sato |
| 2022/0351762 A1* | 11/2022 | Ang ......................... G11C 8/08 |
| 2022/0392555 A1* | 12/2022 | Mizukoshi ......... G11C 16/3481 |
| 2024/0069803 A1* | 2/2024 | Yang ...................... G11C 16/10 |
| 2024/0071508 A1* | 2/2024 | Yang .................. G11C 16/0483 |
| 2024/0071509 A1* | 2/2024 | Yang ................... G11C 16/102 |

\* cited by examiner

DATA HANDLING DURING A REFLOW OPERATION

CROSS REFERENCE

The present Application for Patent is a 371 national phase filing of International Patent Application No. PCT/CN2022/115115 by Pan et al., entitled "DATA HANDLING DURING A REFLOW OPERATION," filed Aug. 26, 2022, assigned to the assignee hereof, and expressly incorporated by reference herein.

FIELD OF TECHNOLOGY

The following relates to one or more systems for memory, including data handling during a reflow operation.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read (e.g., sense, detect, retrieve, identify, determine, evaluate) the state of one or more memory cells within the memory device. To store information, a component may write (e.g., program, set, assign) one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be described in terms of volatile configurations or non-volatile configurations. Volatile memory cells (e.g., DRAM) may lose their programmed states over time unless they are periodically refreshed by an external power source. Non-volatile memory cells (e.g., NAND) may maintain their programmed states for extended periods of time even in the absence of an external power source.

DETAILED DESCRIPTION

Figure 1:
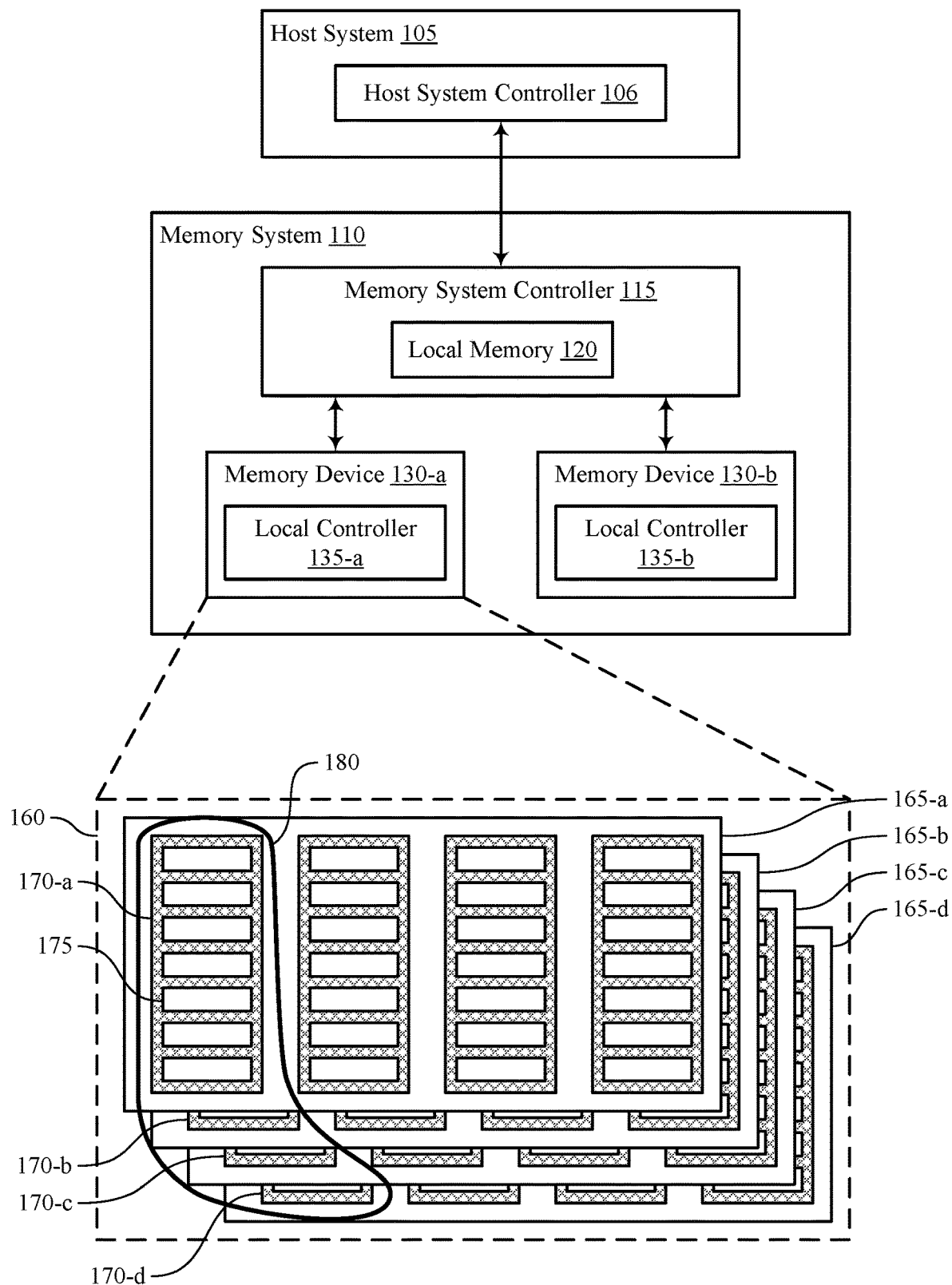
FIG. 1 illustrates an example of a system that supports data handling during a reflow operation in accordance with examples as disclosed herein.

A memory system may undergo multiple operations during manufacturing. For example, the memory system may undergo a reflow operation during manufacturing. The reflow operation may be described as a method of attaching surface mount components to a printed circuit board (PCB). During the reflow operation, the memory system may be exposed to extremely high temperatures (e.g., 260 degrees Celcius) which may cause errors in data (e.g., charge loss in memory cells) stored at the memory system. In an effort to reduce data loss, the memory system may manipulate the data. For example, prior to the reflow operation, the memory system may move at least a portion of the data stored in multi-level cells (MLCs), tri-level cells (TLCs), or quad-level cells (QLCs) of the memory system to single-level cells (SLCs) of the memory system. Moving the data from these cells that store multiple bits to SLCs may increase the reliability of the data. However, in some examples, the memory system may undergo multiple reflow operations. For example, a first reflow operation may be performed to mount the memory system to a first PCB (e.g., daughter PCB) and a second reflow operation may be performed to mount the first PCB to a second PCB. In between the first reflow operation and the second reflow operation, the data stored at the memory system may be accessed (e.g., via a read command or a write command). The memory may manipulate the data stored in memory system prior to the first reflow operation, but may not manipulate the data stored in the memory system prior to second reflow operation. As such, the data stored in the memory system may be susceptible to errors resulting from performing the second reflow operation.

As described herein, prior to performing a reflow operation, a host system may transmit a command to the memory system indicating that the reflow operation is to be performed on the memory system. Upon receiving the command, the memory system may compare an amount of data stored in the memory system to a threshold. If the data is below the threshold, the memory system may manipulate the data stored in the memory system in an effort to reduce data loss resulting from performing the reflow operation. As one example, the memory system may move at least a portion of the data from MLCs, TLCs, or QLCs of the memory system to SLCs of the memory system. After data manipulation, the reflow operation may be performed on the memory system. Alternatively, if the data stored in the memory system is above the threshold, the memory system may transmit signaling to the host system indicating that the memory system is not ready for the reflow operation and the reflow operation may not be performed on the memory system. The host system may transmit the command prior to each reflow operation in the case that multiple reflow operations are performed on the system. Informing the memory system of the reflow operation may allow the memory system to manipulate the data prior to each reflow operation, which may reduce data loss associated with performing multiple reflow operations.

Features of the disclosure are initially described in the context of a system with reference to FIG. 1. Features of the disclosure are described in the context of a flow diagram with reference to FIG. 2. These and other features of the disclosure are further illustrated by and described in the context of an apparatus diagram and flowcharts that relate to data handling during a reflow operation with reference to FIGS. 3 through 5.

FIG. 1 illustrates an example of a system 100 that supports data handling during a reflow operation in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally, or alternatively, include static random access memory (SRAM) or other memory that may be used by the memory system controller 115 for internal storage or calculations, for example, related to the functions ascribed herein to the memory system controller 115. Additionally, or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally, or alternatively, rely on an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a die 160 (e.g., a memory die). For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally, or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programmed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, L2P mapping tables may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

The system 100 may include any quantity of non-transitory computer readable media that support data handling during a reflow operation. For example, the host system 105 (e.g., a host system controller 106), the memory system 110 (e.g., a memory system controller 115), or a memory device 130 (e.g., a local controller 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

As described herein, the host system 105 may identify that a reflow operation is to be performed on the memory system 110 and transmit a command indicating that the reflow operation is to be performed on the memory system 110 to the memory system 110. In some examples, the host system 105 may generate the command at the host system controller 106 and transmit, via the host system controller 106, the command to the memory system controller 115 of the memory system 110. Upon receiving the command, the memory system controller 115 may determine an amount of data (e.g., valid data or configured data) stored in the die 160 of the memory system 110 and compare the amount of data to a threshold. If the amount of data satisfies (e.g., exceeds) the threshold, the memory system controller 115 may transmit signaling to the host system 105 informing the host system 105 that the reflow operation is not allowed. In response to the signaling, the host system 105 may delay performing the reflow operation on the memory system 110. Additionally or alternatively, the host system 105 may perform one or more operations on the memory system 110 after the reflow operation in an attempt to restore any of the data lost during the reflow operation in response to the signaling. Alternatively, if the amount of data is below the threshold, the memory system controller 115 may perform an operation on the memory die 160. In one example, the memory system controller 115 may store a copy of data stored in a first set of memory cells of the die 160 in a second set of memory cell of the die 160. Upon completion of the operation, the reflow operation may be performed on the memory system 110. In some examples, the host system 105 may identify that a second reflow operation is to be performed on the memory system 110 and transmit a second command indicating that the second reflow operation is to be performed on the memory system 110. In such example, the above steps (e.g., associated with the reflow operation) may be repeated, but for the second reflow operation.

Figure 2:
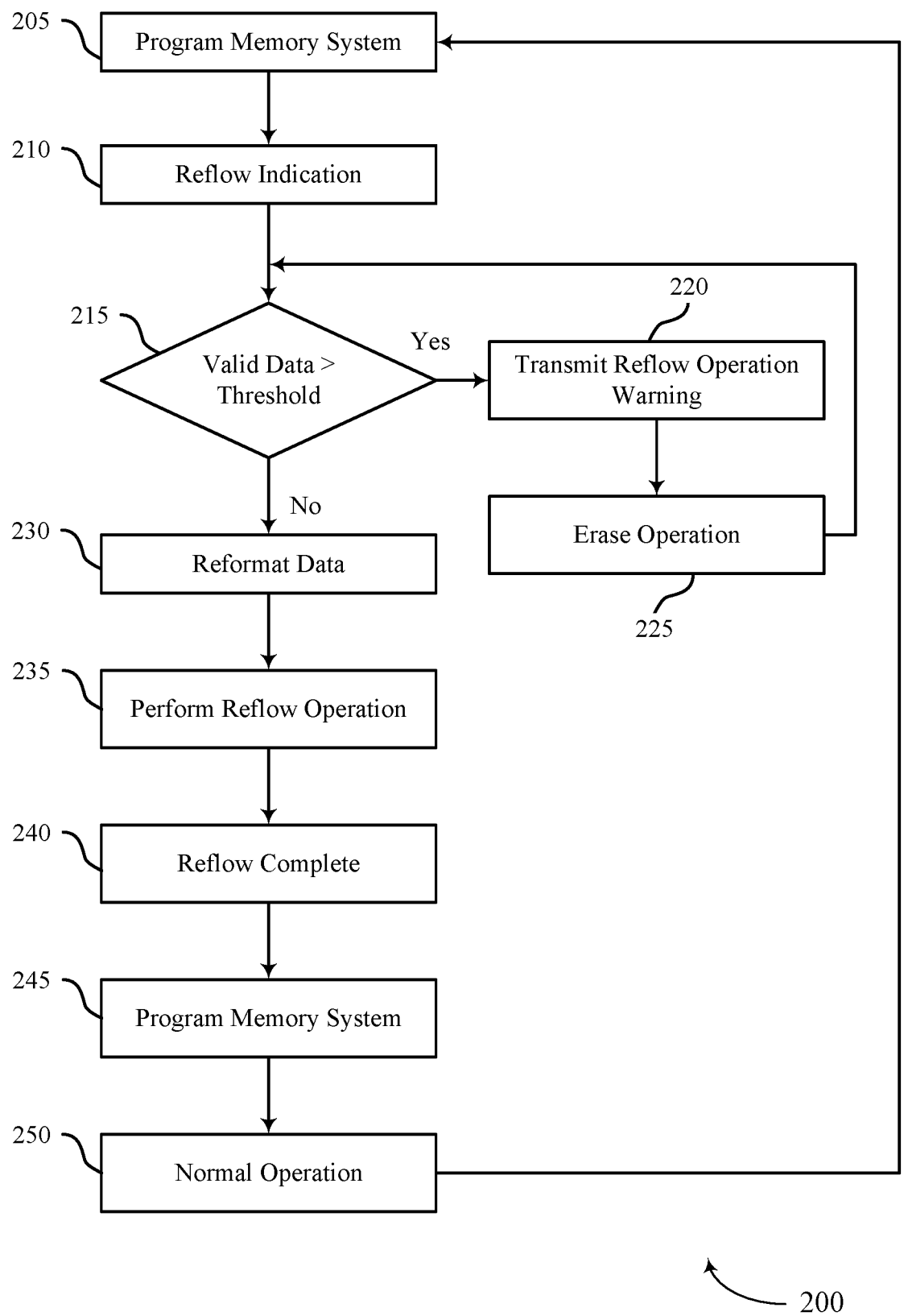
FIG. 2 illustrates an example of a flow diagram that supports data handling during a reflow operation in accordance with examples as disclosed herein.

FIG. 2 illustrates an example of a flow diagram 200 that supports data handling during a reflow operation in accordance with examples as disclosed herein. The flow diagram 200 may be performed by a memory system (or one or more components thereof), such as a memory system 110 as described with reference to FIG. 1. In some cases, alternative examples of the following may be implemented, where some operations may be performed in a different order than described or are not performed at all. Additionally or alternatively, operations may include additional features not mentioned below, or further processes may be added.

At 205, a memory system (e.g., eMMC, UFS, or ball grid array (BGA) SSD) may be programmed. In some examples, a first vendor may manufacture a module with the memory system (e.g., manufacture a daughter card). Prior to mounting the memory system on the module, the first vendor may program the memory system. For example, the first vendor may store data (e.g., operating system data or boot code) in a memory array of the memory system associated with the aspects related to the first vendor. In some examples, the memory array of the memory system may include different memory cell types. For example, a first portion of the memory array may include memory cells configured to store more than one bit of data (e.g., MLCs, TLCs, QLCs) and a second portion of the memory array may include memory cells configured to store one bit of data (e.g., SLCs). In such example, the first vendor may store at least a portion of the data in the second portion of the memory array.

At 210, a command may be received by a memory system. In some examples, the memory system may receive the command from a host system upon initialization of manufacturing equipment (e.g., managed by the first vendor). The command may indicate that a first reflow operation is to be performed on the memory system. Additionally, the command may include characteristics of the first reflow operation (e.g., a time it will take to complete the reflow operation or a temperature that the memory system will be exposed to during the first reflow operation). Moreover, the command may include an indication of a timing constraint (e.g., threshold duration). The host system may determine the timing constraint based on a capability (e.g., a processing capability or a power capability) of the memory system or the host system. In some examples, the first reflow operation may include mounting the memory system on the module to create the daughter card.

At 215, whether an amount of the data (e.g., programmed data) stored in the memory array of the memory system exceeds a threshold may be determined. In some examples, the memory system may determine whether the data stored in the memory array exceeds the threshold. Prior to determining whether the data stored in the memory array exceeds a threshold, the memory system may perform an internal check and remove invalid data without mapping the relationship physically. In such example, the data stored in the memory array may include the remaining valid data. If the amount of data stored in the memory array exceeds the threshold, the memory system may proceed to step 220. Alternatively, if the amount of data does not exceed the threshold, the memory system may proceed to step 230. In some examples, the threshold may be equal to a JEDEC PSA max program size.

At 220, the memory system may provide (transmit) a reflow warning to the host system. Because the amount of data was above the threshold, the memory system may not have enough free space to perform any reflow mitigation operations (e.g., data reformatting). As such, the reflow warning may indicate that the first reflow operation is not allowable during this time. Additionally, the host system may obtain the amount of data stored in the memory array from a register (e.g., eCSD register for eMMC), attributes (e.g., attributes for UFS), or a log page (e.g., a log page for SSD) of the memory system. In response to the reflow warning, the host system may delay the reflow operation. In some examples, the host system may delay the reflow operation after receiving a first reflow warning signal and initiate the reflow operation upon receiving confirmation signaling from the memory system. The confirmation signaling may be triggered if the data stored in memory system does not exceed the threshold (e.g., at 215 after one or more rounds of 225) or if counter at the memory system exceeds a threshold.

At 225, discard, erase, or unmap operations may be performed on the memory system (e.g., to free up more space in the memory array). In some examples, the host system may transmit a command to the memory system to discard, erase, or unmap at least a portion of the data stored at the memory system. After completing the command, the memory system may proceed to 215 and determine (e.g., for a second time) whether the amount of data stored in the memory system exceeds the threshold. If the amount of data stored in the memory system does not exceed the threshold at 215, the memory system may transmit the confirmation signaling to the memory system and the memory system may proceed with the reflow operation at 235. In some examples, even after the discard, erase, or unmap operations, the amount of data stored in the memory system may not be below the threshold. In such case, the memory system may implement a counter. Each time the memory system enters step 215 (e.g., compares the amount of data to a threshold), the memory system may increment the counter. If the counter exceeds a threshold, the memory system may transmit the confirmation signaling to the host system and the host system may initiate the reflow operation.

At 230, the data stored in the memory array may be reformatted. In some examples, the memory system may reformat the data stored in the memory array. Because the amount of data was below the threshold, there may enough free space to perform reflow mitigation operations (e.g., data reformatting). In one example, the memory system may read data stored in memory cells configured to store more than 1 bit (e.g., MLCs, TLCs, QLCs) of the memory array (e.g., at least a portion of the data stored in the memory array) and write the data to memory cells configured to stored 1 bit (e.g., SLCs) of the memory array. SLCs may be associate with better reliability because SLCs may have a larger read window (e.g., voltage difference between threshold voltage and reference voltage) when compared to MLCs, TLCs, or QLCs.

Additionally or alternatively, the memory system may move the data stored in memory array to a new location. For example, the memory system may read data stored in a first set of memory cells of the memory array (e.g., at least a portion of the data stored in the memory array) and write the data to a second set of cells of the memory array different from the first set of cells. Additionally or alternatively, the memory system may copy the data stored in the memory array. For example, the memory array may write a copy of at least a portion of the data stored in a first set of memory cells of the memory array to a second set of memory cells of the memory array. Additionally or alternatively, the memory system may add parity bits to the data stored in the memory array. For example, the memory system may read at least a portion of the data stored in the memory array and generate a set of parity bits associated with the portion of data. The memory system may than attach the parity bits to the portion of data and store the portion of data, along with the parity bits, in the memory array. The memory system may utilize the parity bits to determine whether an error has occurred in the portion of the data. Additionally or alternatively, the memory system may adjust a threshold voltage of memory cells used to store the data in the memory array.

In some examples, the memory system may determine how to reformat the data based on the characteristics of the first reflow operation or the timing constraint indicated in the command. For example, if the timing constraint is below a threshold, the memory system may reformat the data rather quickly (e.g., by moving the data from MLCs, QLCs, or TLCs to SLCs). If the timing constraint is above a threshold, the memory system may reformat the data rather slowly (e.g., by adjusting the threshold voltage of the memory cells). While the memory system is reformatting the data, the memory system may be busy and the host system may retrieve a status associated with the memory system reformatting the data to determine when the reformatting is complete. The host system may retrieve the status from a register (e.g., eCSD register for eMMC), attributes (e.g., attributes for UFS), or a log page (e.g., a log page for SSD). In some examples, the status may be a percentage. 0 to 99% may indicate that the memory system is still busy reformatting the data and 100% may indicate that the memory system is done reformatting the data. In some examples, the memory system may encounter a power loss. If the power loss occurs during steps 205 through 230, the host system may retransmit the command.

At 235, the first reflow operation may be performed on the memory system. As described above, the first reflow operation may include mounting the memory system to the module to create the daughter card.

At 240, a reflow complete status may be obtained at the memory system. The reflow complete status may inform the memory system that the first reflow operation is complete. In some examples, the host system may inform the memory system that the first reflow operation is complete by writing a register (e.g., eCSD register for eMMC), attributes (e.g., attributes for UFS), or a log page (e.g., a log page for SSD). Alternatively, the memory system may receive a read command from the host system (e.g., after a power cycle) and assume the reflow complete status if the memory system is in reflow configuration.

At 245, the memory system may potentially be programmed. In some examples, the first vendor may test a functionality of the daughter card (e.g., perform a module test) and may potentially program additional data to the memory array. Additionally, prior to being programmed and after receiving the reflow complete status, the memory system may undo the reformatting of the data which was done at 230. As one example, the memory system may write the portion of the data stored at memory cells configured to store one bit (e.g., SLCs) of the memory array to memory cell configured to store more than one bit (e.g., MLCs, TLCs, QLCs) of the memory array.

At 250, the memory system may function normally. That is, the host system may perform access operations (e.g., read operation or write operations) on the memory array of the memory system.

In some examples, after completion of the first reflow operation, the daughter card may be passed to a second vendor and the second vendor may attached the daughter card to a PCB. In order to attached the daughter card to the PCB, a second reflow operation may be performed on the memory system. As such, the memory system may proceed to step 205 and the second vendor may program data to the memory system. Therefore, the memory array may include data from the first vendor and data from the second vendor. The memory system may then proceed to steps 210 through 250 (repeat steps 210 through 250). Steps 205 through 250 may be repeated for any additional reflow operation that is to be performed on the memory system. Using such technique as described herein may allow for multiple reflow operations to be performed on the memory system with little to no data loss. Additionally, by using such techniques, third party vendors may reduce storing data in special way (e.g., directly manipulate the data) for future reflow operations.

Figure 3:
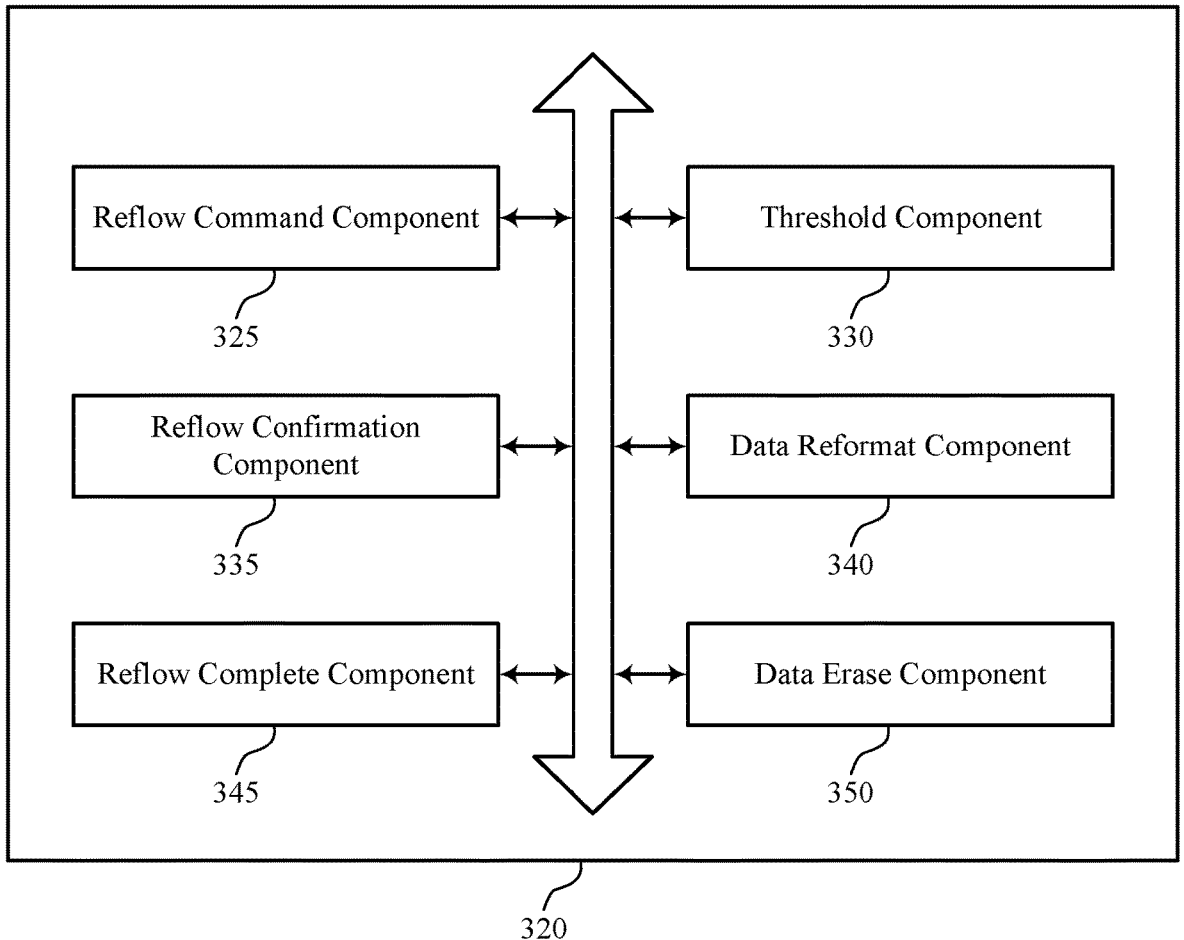
FIG. 3 shows a block diagram of a memory system that supports data handling during a reflow operation in accordance with examples as disclosed herein.

FIG. 3 shows a block diagram 300 of a memory system 320 that supports data handling during a reflow operation in accordance with examples as disclosed herein. The memory system 320 may be an example of aspects of a memory system as described with reference to FIGS. 1 through 2.

The memory system 320, or various components thereof, may be an example of means for performing various aspects of data handling during a reflow operation as described herein. For example, the memory system 320 may include a reflow command component 325, a threshold component 330, a reflow confirmation component 335, a data reformat component 340, a reflow complete component 345, a data erase component 350, or any combination thereof. Each of these components may communicate, directly or indirectly, with one another (e.g., via one or more buses).

The reflow command component 325 may be configured as or otherwise support a means for receiving, at a memory system, first signaling indicating that a reflow operation is to be performed on the memory system. The threshold component 330 may be configured as or otherwise support a means for determining, based at least in part on receiving the first signaling, whether an amount of data stored in a first plurality of memory cells within one or more memory devices of the memory system satisfy a threshold. The reflow confirmation component 335 may be configured as or otherwise support a means for communicating an indication of whether the memory system is ready for the reflow operation based at least in part on the amount of data satisfying the threshold.

In some examples, the data reformat component 340 may be configured as or otherwise support a means for reformatting a portion of the data stored in the one or more memory devices based at least in part on the amount of the data satisfies the threshold, where communicating the indication is based at least in part on reformatting the portion of the data.

In some examples, to support reformatting the data, the data reformat component 340 may be configured as or otherwise support a means for writing the portion of the data to a second plurality of memory cells storing one bit of information.

In some examples, to support reformatting the data, the data reformat component 340 may be configured as or otherwise support a means for writing the portion of the data stored in the first plurality of memory cells to a second plurality of memory cells.

In some examples, to support reformatting the data, the data reformat component 340 may be configured as or otherwise support a means for writing a copy of the portion of the data to a second plurality of memory cell.

In some examples, to support reformatting the data, the data reformat component 340 may be configured as or otherwise support a means for generating a set of parity bits associated with the portion of the data. In some examples, to support reformatting the data, the data reformat component 340 may be configured as or otherwise support a means for writing the portion of the data and the set of parity bits to a second plurality of memory cells of the one or more memory devices.

In some examples, to support reformatting the data, the data reformat component 340 may be configured as or otherwise support a means for adjusting a threshold voltage associated with the first plurality of memory cells.

In some examples, to support communicating the indication, the reflow confirmation component 335 may be configured as or otherwise support a means for transmitting second signaling indicating the memory system is ready for the reflow operation based at least in part on reformatting the portion of the data stored in the one or more memory devices.

In some examples, the first signaling indicates a timing constraint for performing the reflow operation. In some examples, reformatting the portion of the data is based at least the timing constraint.

In some examples, the first signaling indicates characteristics of the reflow operation. In some examples, reformatting the portion of the data is based at least in part on the characteristics of the reflow operation.

In some examples, to support communicating the indication, the reflow confirmation component 335 may be configured as or otherwise support a means for communicating a percentage of the portion of the data that has been reformatted.

In some examples, to support communicating the indication, the reflow confirmation component 335 may be configured as or otherwise support a means for transmitting second signaling indicating the memory system is not ready for the reflow operation based at least in part on the amount of the data failing to satisfy the threshold.

In some examples, the second signaling indicates the amount of the data.

In some examples, the data erase component 350 may be configured as or otherwise support a means for receiving, based at least in part on transmitting the second signaling, third signaling indicating to erase a second portion of the data.

In some examples, the reflow complete component 345 may be configured as or otherwise support a means for receiving fourth signaling indicating that the reflow operation is complete.

In some examples, the reflow command component 325 may be configured as or otherwise support a means for transmitting fifth signaling indicating that the reflow operation is to be performed on the memory system based at least in part on the memory system experiencing a power loss after receiving the first signaling.

Figure 4:
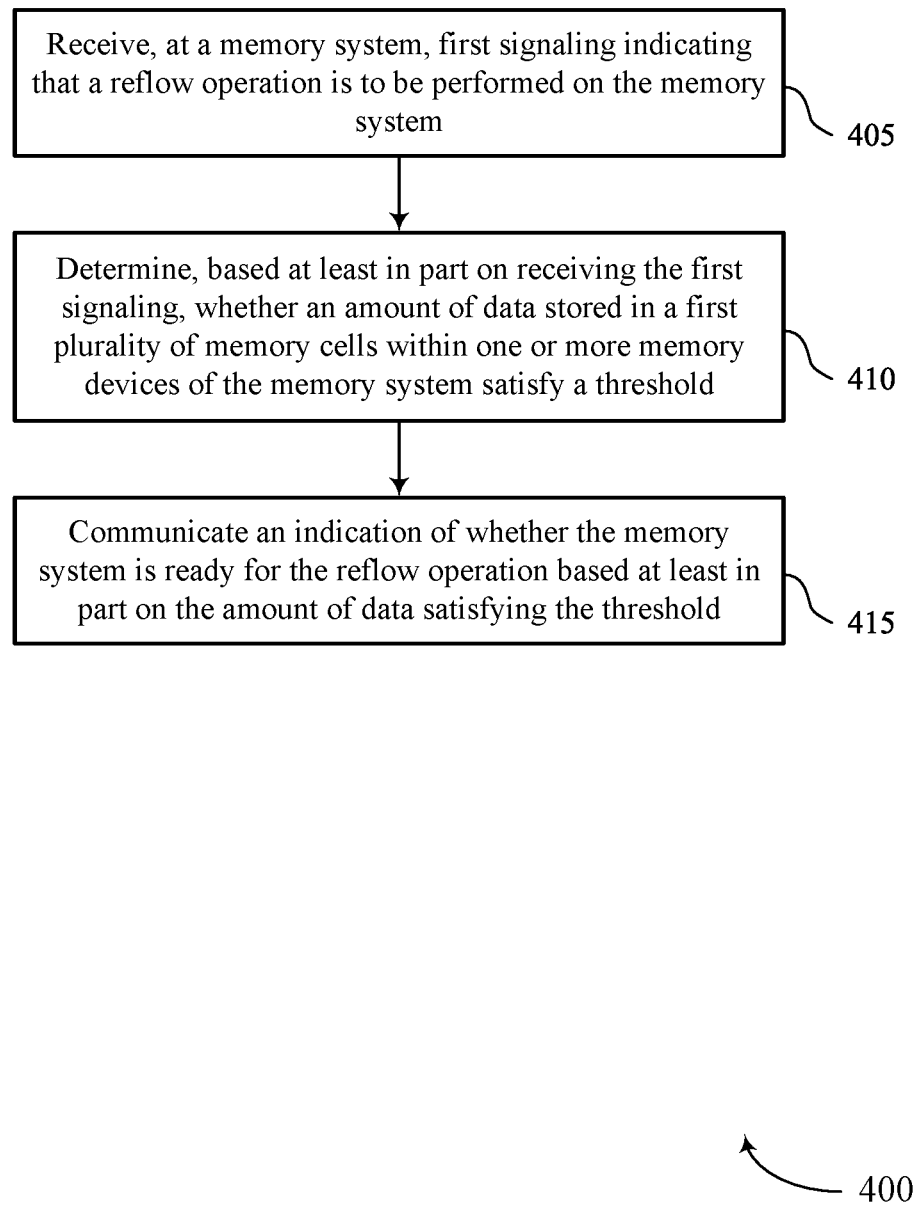
FIGS. 4 and 5 show flowcharts illustrating a method or methods that support data handling during a reflow operation in accordance with examples as disclosed herein.

FIG. 4 shows a flowchart illustrating a method 400 that supports data handling during a reflow operation in accordance with examples as disclosed herein. The operations of method 400 may be implemented by a memory system or its components as described herein. For example, the operations of method 400 may be performed by a memory system as described with reference to FIGS. 1 through 3. In some examples, a memory system may execute a set of instructions to control the functional elements of the device to perform the described functions. Additionally, or alternatively, the memory system may perform aspects of the described functions using special-purpose hardware.

At 405, the method may include receiving, at a memory system, first signaling indicating that a reflow operation is to be performed on the memory system. The operations of 405 may be performed in accordance with examples as disclosed herein. In some examples, aspects of the operations of 405 may be performed by a reflow command component 325 as described with reference to FIG. 3.

At 410, the method may include determining, based at least in part on receiving the first signaling, whether an amount of data stored in a first plurality of memory cells within one or more memory devices of the memory system satisfy a threshold. The operations of 410 may be performed in accordance with examples as disclosed herein. In some examples, aspects of the operations of 410 may be performed by a threshold component 330 as described with reference to FIG. 3.

At 415, the method may include communicating an indication of whether the memory system is ready for the reflow operation based at least in part on the amount of data satisfying the threshold. The operations of 415 may be performed in accordance with examples as disclosed herein. In some examples, aspects of the operations of 415 may be performed by a reflow confirmation component 335 as described with reference to FIG. 3.

In some examples, an apparatus as described herein may perform a method or methods, such as the method 400. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for receiving, at a memory system, first signaling indicating that a reflow operation is to be performed on the memory system; determining, based at least in part on receiving the first signaling, whether an amount of data stored in a first plurality of memory cells within one or more memory devices of the memory system satisfy a threshold; and communicating an indication of whether the memory system is ready for the reflow operation based at least in part on the amount of data satisfying the threshold.

Aspect 2: The method, apparatus, or non-transitory computer-readable medium of aspect 1, further including operations, features, circuitry, logic, means, or instructions, or any combination thereof for reformatting a portion of the data stored in the one or more memory devices based at least in part on the amount of the data satisfies the threshold, where communicating the indication is based at least in part on reformatting the portion of the data.

Aspect 3: The method, apparatus, or non-transitory computer-readable medium of aspect 2, where reformatting the data includes operations, features, circuitry, logic, means, or instructions, or any combination thereof for writing the portion of the data to a second plurality of memory cells storing one bit of information.

Aspect 4: The method, apparatus, or non-transitory computer-readable medium of any of aspects 2 through 3, where reformatting the data includes operations, features, circuitry, logic, means, or instructions, or any combination thereof for writing the portion of the data stored in the first plurality of memory cells to a second plurality of memory cells.

Aspect 5: The method, apparatus, or non-transitory computer-readable medium of any of aspects 2 through 4, where reformatting the data includes operations, features, circuitry, logic, means, or instructions, or any combination thereof for writing a copy of the portion of the data to a second plurality of memory cell.

Aspect 6: The method, apparatus, or non-transitory computer-readable medium of any of aspects 2 through 5, where reformatting the data includes operations, features, circuitry, logic, means, or instructions, or any combination thereof for generating a set of parity bits associated with the portion of the data and writing the portion of the data and the set of parity bits to a second plurality of memory cells of the one or more memory devices.

Aspect 7: The method, apparatus, or non-transitory computer-readable medium of any of aspects 2 through 6, where reformatting the data includes operations, features, circuitry, logic, means, or instructions, or any combination thereof for adjusting a threshold voltage associated with the first plurality of memory cells.

Aspect 8: The method, apparatus, or non-transitory computer-readable medium of any of aspects 2 through 7, where communicating the indication includes operations, features, circuitry, logic, means, or instructions, or any combination thereof for transmitting second signaling indicating the memory system is ready for the reflow operation based at least in part on reformatting the portion of the data stored in the one or more memory devices.

Aspect 9: The method, apparatus, or non-transitory computer-readable medium of any of aspects 2 through 8, where the first signaling indicates a timing constraint for performing the reflow operation and reformatting the portion of the data is based at least the timing constraint.

Aspect 10: The method, apparatus, or non-transitory computer-readable medium of any of aspects 2 through 9, where the first signaling indicates characteristics of the reflow operation and reformatting the portion of the data is based at least in part on the characteristics of the reflow operation.

Aspect 11: The method, apparatus, or non-transitory computer-readable medium of any of aspects 2 through 10, where communicating the indication includes operations, features, circuitry, logic, means, or instructions, or any combination thereof for communicating a percentage of the portion of the data that has been reformatted.

Aspect 12: The method, apparatus, or non-transitory computer-readable medium of any of aspects 1 through 7, where communicating the indication includes operations, features, circuitry, logic, means, or instructions, or any combination thereof for transmitting second signaling indicating the memory system is not ready for the reflow operation based at least in part on the amount of the data failing to satisfy the threshold.

Aspect 13: The method, apparatus, or non-transitory computer-readable medium of aspect 12, where the second signaling indicates the amount of the data.

Aspect 14: The method, apparatus, or non-transitory computer-readable medium of any of aspects 12 through 13, further including operations, features, circuitry, logic, means, or instructions, or any combination thereof for receiving, based at least in part on transmitting the second signaling, third signaling indicating to erase a second portion of the data.

Aspect 15: The method, apparatus, or non-transitory computer-readable medium of any of aspects 1 through 14, further including operations, features, circuitry, logic, means, or instructions, or any combination thereof for receiving fourth signaling indicating that the reflow operation is complete.

Aspect 16: The method, apparatus, or non-transitory computer-readable medium of any of aspects 1 through 15, further including operations, features, circuitry, logic, means, or instructions, or any combination thereof for transmitting fifth signaling indicating that the reflow operation is to be performed on the memory system based at least in part on the memory system experiencing a power loss after receiving the first signaling.

Figure 5:
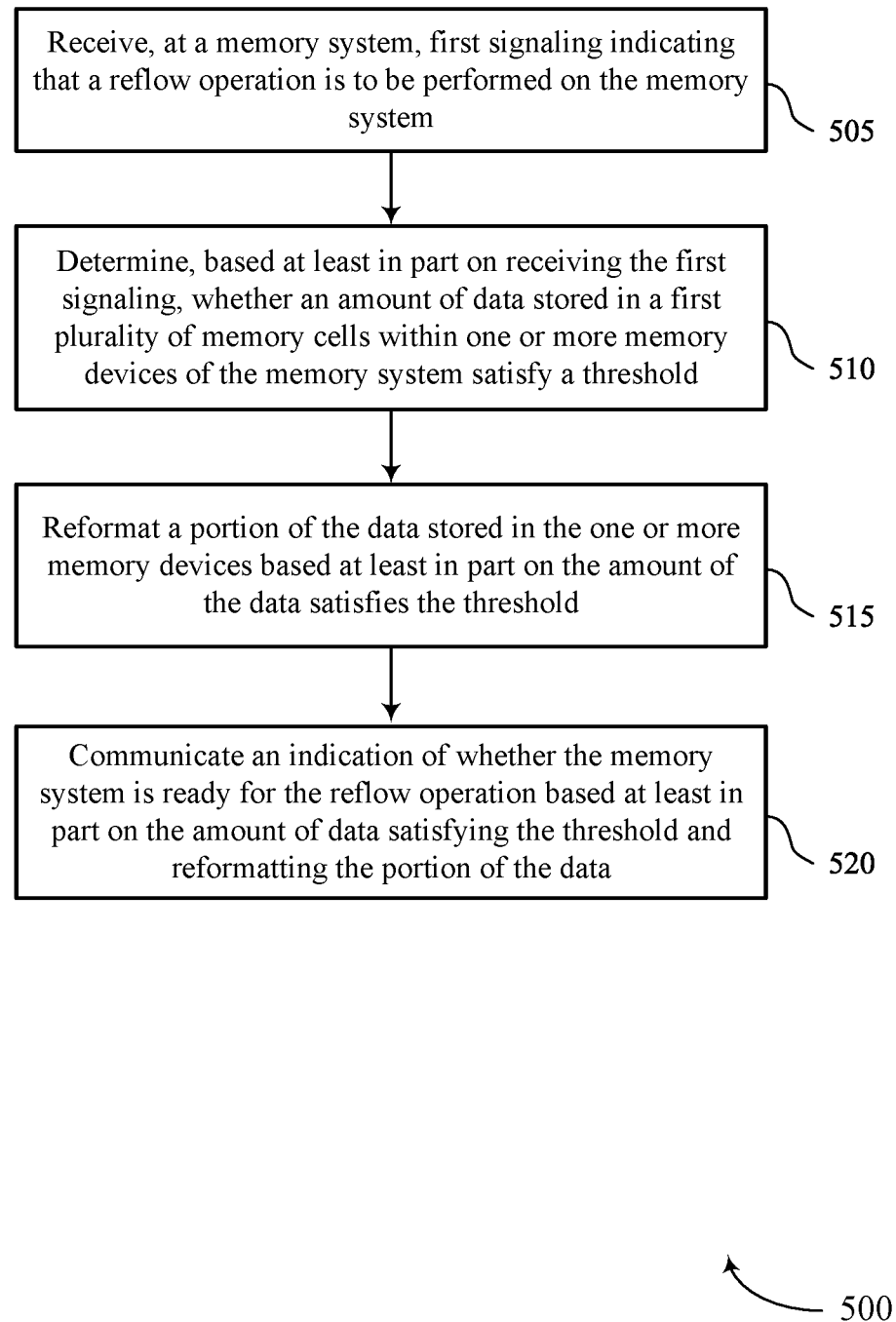

FIG. 5 shows a flowchart illustrating a method 500 that supports data handling during a reflow operation in accordance with examples as disclosed herein. The operations of method 500 may be implemented by a memory system or its components as described herein. For example, the operations of method 500 may be performed by a memory system as described with reference to FIGS. 1 through 3. In some examples, a memory system may execute a set of instructions to control the functional elements of the device to perform the described functions. Additionally, or alternatively, the memory system may perform aspects of the described functions using special-purpose hardware.

At 505, the method may include receiving, at a memory system, first signaling indicating that a reflow operation is to be performed on the memory system. The operations of 505 may be performed in accordance with examples as disclosed herein. In some examples, aspects of the operations of 505 may be performed by a reflow command component 325 as described with reference to FIG. 3.

At 510, the method may include determining, based at least in part on receiving the first signaling, whether an amount of data stored in a first plurality of memory cells within one or more memory devices of the memory system satisfy a threshold. The operations of 510 may be performed in accordance with examples as disclosed herein. In some examples, aspects of the operations of 510 may be performed by a threshold component 330 as described with reference to FIG. 3.

At 515, the method may include reformatting a portion of the data stored in the one or more memory devices based at least in part on the amount of the data satisfies the threshold. The operations of 515 may be performed in accordance with examples as disclosed herein. In some examples, aspects of the operations of 515 may be performed by a data reformat component 340 as described with reference to FIG. 3.

At 520, the method may include communicating an indication of whether the memory system is ready for the reflow operation based at least in part on the amount of data satisfying the threshold and reformatting the portion of the data. The operations of 520 may be performed in accordance with examples as disclosed herein. In some examples, aspects of the operations of 520 may be performed by a reflow confirmation component 335 as described with reference to FIG. 3.

It should be noted that the described techniques include possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if", "when," "based on," or "based at least in part on" are used to describe a conditional action, a conditional process, or connection between portions of a process, the terms may be interchangeable.

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally, or alternatively (e.g., in an alternative example), be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:
    receiving, at a memory system, first signaling indicating that a reflow operation is to be performed on the memory system;
    determining, based at least in part on receiving the first signaling, whether an amount of data stored in a first plurality of memory cells within one or more memory devices of the memory system satisfies a threshold;
    reformatting, based at least in part on the amount of data satisfying the threshold, a portion of the data stored to the first plurality of memory cells by writing the data to a second plurality of memory cells, wherein the first plurality of memory cells store two or more bits of information per cell and the second plurality of memory cells store one bit of information per cell; and
    communicating an indication of whether the memory system is ready for the reflow operation based at least in part on the amount of data satisfying the threshold.

2. The method of claim 1, wherein reformatting the data further comprises:
    writing a copy of the portion of the data to the second plurality of memory cells.

3. The method of claim 1, wherein reformatting the data further comprises:
    generating a set of parity bits associated with the portion of the data; and
    writing the portion of the data and the set of parity bits to the second plurality of memory cells of the one or more memory devices.

4. The method of claim 1, wherein reformatting the data further comprises:
    adjusting a threshold voltage associated with the first plurality of memory cells.

5. The method of claim 1, wherein communicating the indication comprises:
    transmitting second signaling indicating the memory system is ready for the reflow operation based at least in part on reformatting the portion of the data stored in the one or more memory devices.

6. The method of claim 1, wherein the first signaling indicates a timing constraint for performing the reflow operation, and wherein reformatting the portion of the data is based at least the timing constraint.

7. The method of claim 1, wherein the first signaling indicates characteristics of the reflow operation, and wherein reformatting the portion of the data is based at least in part on the characteristics of the reflow operation.

8. The method of claim 1, wherein communicating the indication comprises:
    communicating a percentage of the portion of the data that has been reformatted.

9. The method of claim 1, wherein communicating the indication comprises:
    transmitting second signaling indicating the memory system is not ready for the reflow operation based at least in part on the amount of the data failing to satisfy the threshold.

10. The method of claim 9, wherein the second signaling indicates the amount of the data.

11. The method of claim 9, further comprising:
    receiving, based at least in part on transmitting the second signaling, third signaling indicating to erase a second portion of the data.

12. The method of claim 1, further comprising:
    receiving fourth signaling indicating that the reflow operation is complete.

13. The method of claim 1, further comprising:
    transmitting fifth signaling indicating that the reflow operation is to be performed on the memory system based at least in part on the memory system experiencing a power loss after receiving the first signaling.

14. A non-transitory computer-readable medium storing code, the code comprising instructions executable by a processor to:
    receive, at a memory system, first signaling indicating that a reflow operation is to be performed on the memory system;
    determine, based at least in part on receiving the first signaling, whether an amount of data stored in a first plurality of memory cells within one or more memory devices of the memory system satisfies a threshold;

reformat, based at least in part on the amount of data satisfying the threshold, a portion of the data stored to the first plurality of memory cells by writing the data to a second plurality of memory cells, wherein the first plurality of memory cells store two or more bits of information per cell and the second plurality of memory cells store one bit of information per cell; and communicate an indication of whether the memory system is ready for the reflow operation based at least in part on the amount of data satisfying the threshold.

15. The non-transitory computer-readable medium of claim 14, wherein the instructions to communicate the indication are executable by the processor to:

transmit second signaling indicating the memory system is ready for the reflow operation based at least in part on reformatting the portion of the data stored in the one or more memory devices.

16. The non-transitory computer-readable medium of claim 14, wherein the instructions to communicate the indication are executable by the processor to:

transmit second signaling indicating the memory system is not ready for the reflow operation based at least in part on the amount of the data failing to satisfy the threshold.

17. The non-transitory computer-readable medium of claim 14, wherein the instructions are further executable by the processor to:

receive fourth signaling indicating that the reflow operation is complete.

18. An apparatus, comprising: a controller associated with a memory device, wherein the controller is configured to cause the apparatus to:

receive, at a memory system, first signaling indicating that a reflow operation is to be performed on the memory system;

determine, based at least in part on receiving the first signaling, whether an amount of data stored in a first plurality of memory cells within one or more memory devices of the memory system satisfies a threshold;

reformat, based at least in part on the amount of data satisfying the threshold, a portion of the data stored to the first plurality of memory cells by writing the data to a second plurality of memory cells, wherein the first plurality of memory cells store two or more bits of information per cell and the second plurality of memory cells store one bit of information per cell; and communicate an indication of whether the memory system is ready for the reflow operation based at least in part on the amount of data satisfying the threshold.

19. The apparatus of claim 18, wherein communicating the indication is configured to cause the apparatus to:

transmit second signaling indicating the memory system is ready for the reflow operation based at least in part on reformatting the portion of the data stored in the one or more memory devices.

20. The apparatus of claim 18, wherein communicating the indication is configured to cause the apparatus to:

transmit second signaling indicating the memory system is not ready for the reflow operation based at least in part on the amount of the data failing to satisfy the threshold.

* * * * *